(12) United States Patent
Li et al.

(10) Patent No.: US 8,112,038 B2
(45) Date of Patent: Feb. 7, 2012

(54) BEAMFORMING WITH IMPERFECT CHANNEL STATE INFORMATION

(75) Inventors: Ye Li, Marietta, GA (US); Anthony C. K. Soong, Plano, TX (US); Yinggang Du, Shenzhen (CN); Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1499 days.

(21) Appl. No.: 11/532,488

(22) Filed: Sep. 15, 2006

(65) Prior Publication Data

US 2008/0070564 A1 Mar. 20, 2008

(51) Int. Cl.
*H04B 1/00* (2006.01)
(52) U.S. Cl. ...... 455/63.1; 455/13.3; 370/317; 370/318; 370/319; 370/320; 370/321; 370/322
(58) Field of Classification Search .......... 370/317–322; 455/13.3, 63.3
See application file for complete search history.

(56) References Cited

U.S. PATENT DOCUMENTS

| | | | | |
|---|---|---|---|---|
| 6,956,907 | B2 * | 10/2005 | Ketchum | 375/267 |
| 2003/0161282 | A1 * | 8/2003 | Medvedev et al. | 370/329 |
| 2004/0042439 | A1 * | 3/2004 | Menon et al. | 370/343 |
| 2005/0276347 | A1 * | 12/2005 | Mujtaba et al. | 375/299 |
| 2006/0014499 | A1 * | 1/2006 | Gorokhov et al. | 455/102 |
| 2006/0067428 | A1 * | 3/2006 | Poon | 375/299 |
| 2006/0104382 | A1 * | 5/2006 | Yang et al. | 375/267 |
| 2006/0121946 | A1 * | 6/2006 | Walton et al. | 455/561 |

OTHER PUBLICATIONS

EP1396956, Mitsubishi.*
Gershman, "Robust downlink power adjustment in cellular communication systems with antenna arrays at base stations," Proc. of 2003 4th IEEE Workshop on Signal Processing Advances in Wireless Commun., pp. 634-638, Jun. 2003.*
Sayed, "A multi user beamforming scheme for downlink MIMO channels based on maximizing signal-toleakage ratios," Proc. of IEEE International Conf. on Acoustics, Speech, and Signal Processing (ICASSP'05), pp. 18-23, Mar. 2005.*
PCT International Search Report of PCT/CN2007/070700, form PCT/ISA/210, mailed Dec. 13, 2007, Applicant: Huawei Technologies Co., Ltd., et al., 3 pages.
PCT Written Opinion of the International Sewarching Authority for PCT/CN2007/070700, form PCT/ISA/237, mailed Dec. 13, 2007, Applicant: Huawei Technologies Co., Ltd., et al., 5 pages.
Boche, Holger, et al., "A General Duality Theory for Uplink and Downlink Beamforming", IEEE, 2002, pp. 87-91.

(Continued)

*Primary Examiner* — Patrick Edouard
*Assistant Examiner* — Michael Irace
(74) *Attorney, Agent, or Firm* — Slater & Matsil, L.L.P.

(57) ABSTRACT

Disclosed herein is a system and method for downlink beamforming that takes into account imperfect channel state information (CSI) at the transmitter when determining the steering vector used in the beamforming process. The steering vector is calculated to increase the ratio of the average power of a desired signal component to the sum of the interference power of other wireless terminals, referred to as the signal-to-leakage ratio. By accounting for imperfect CSI when calculating the steering vector, the bit-error rate for a given signal-to-noise ratio is decreased. Also disclosed is a power allocation method that improves performance of the system by increasing the signal-to-interference-plus-noise ratio for all of the wireless terminals currently communicating with the base station. The power allocation similarly decreases the bit-error rate for a given signal-to-noise ratio, especially at high signal-to-noise ratios.

24 Claims, 8 Drawing Sheets

OTHER PUBLICATIONS

Biguesh, Mehzad, at al., "Robust Downlink Power Adjustment in Cellular Communication Systems with Antenna Arrays at Base Stations", 2003 4th IEEE Workshop on Signal Processing Advances in Wireless Communications, IEEE, 2003, pp. 834-638.

Goldsmith, Andrea, et al., "Capactiy Limits of MIMO Channels", IEEE Journal on Selected Areas in Communications, vol. 21, No. 5, Jun. 2003, pp. 684-702.

Chalise, Batu, et al., "Robust Downlink Beamforming Based Upon Outage Probability Criterion", IEEE, 2004, pp. 334-338.

Schubert, Martin, et al., "Solution of the Multluser Downlink Beamforming Problem with Individual SINR Constraints", IEEE Transactions on Vehicular Technology, vol. 53, No. 1, Jan. 2004, pp. 18-28.

Spencer, Quentin, et al., "An Introduction to the Multi-User MIMO Downlink", Adaptive Antennas and MIMO Sysems for Wireless Communications, IEEE Communications Magazine, Oct. 2004, pp. 60-67.

Tarighat, Alireza, et al., "A Multi User Beamforming Scheme for Downlink MIMO Channels Based on Maximizing Signal-to-Leakage Ratios", IEEE, ICASSP 2005, pp. III-1129-III-1132.

Schubert, Martin, et al., "Iterative Multiuser Uplink and Downlink Beamforming Under SINR Constraints", IEEE Transactions on Signal Processing, vol. 53, No. 7, Jul. 2005, pp. 2234-2334.

* cited by examiner

BEAMFORMING WITH IMPERFECT CHANNEL STATE INFORMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Beamforming is the process of using an array of antennas to control the direction of a transmitted signal. Signals transmitted from each of the antennas in the array constructively interfere to increase the combined signal strength in a desired direction while destructively interfering to decrease combined signal strength in undesired directions. Beamforming may be used in cellular communications systems to increase the capacity of users that may connect to a single base station. The base station may use beamforming to increase the capacity by simultaneously communicating on the same frequency band with multiple wireless terminals, such as cell phones, that are at different locations.

In order for a base station to perform beamforming, the channel state information (CSI) may be required. The CSI refers to the mathematical representation of a signal channel, namely the way in which a signal traverses a communication medium from a sender to a receiver. The CSI available at the base station for beamforming may be imperfect due to various problems, such as channel estimation error, quantization error, and delay in feedback. The imperfect CSI may increase the bit-error rate for a given signal-to-noise ratio compared with the bit-error rate that is achieved when perfect CSI is available at the base station. As such, it is desirable to perform beamforming using imperfect CSI with less increase in the bit-error rate for a given signal-to-noise ratio.

SUMMARY

Disclosed herein is a telecommunication network component. The telecommunication network component may include a memory configured to store instructions and a processor configured to execute the stored instructions. The stored instructions may comprise: determining a steering vector that accounts for imperfect channel state information, and outputting the steering vector to be applied to a symbol to be transmitted.

Also disclosed herein is a system that comprises a steering vector calculation unit configured to determine a steering vector that accounts for imperfect channel state information. The system may also comprise an array of transmit antennas configured to transmit a signal in accordance with the calculated steering vector.

Further disclosed is a beamforming method for determining a steering vector that accounts for imperfect channel state information. The method may also determine a power allocation that increases the signal strength of at least one signal directed to one of a plurality of wireless terminals. The method may further transmit at least one symbol in accordance with the steering vector and the power allocation.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein is a system and method for downlink beamforming that takes into account imperfect channel state information (CSI) at the transmitter when determining the steering vector used in the beamforming process. The steering vector is calculated to increase the ratio of the average power of a desired signal component to the sum of the interference power of other wireless terminals, referred to as the signal-to-leakage ratio. By accounting for imperfect CSI when calculating the steering vector, the bit-error rate for a given signal-to-noise ratio is decreased. The performance gain can be further increased by increasing the number of transmit antennas while the number of wireless terminals remains fixed. Also disclosed is a power allocation method that improves performance of the system by increasing the signal-to-interference-plus-noise ratio for all of the wireless terminals currently communicating with the base station. The power allocation similarly decreases the bit-error rate for a given signal-to-noise ratio, especially at high signal-to-noise ratios.

Figure 1:
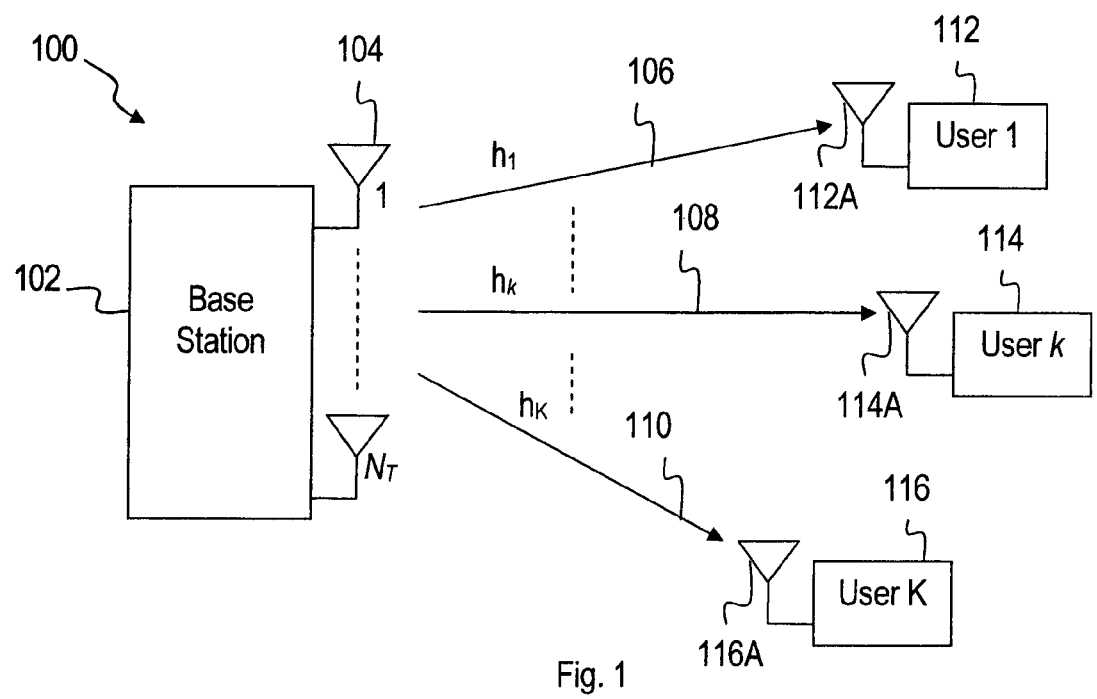
FIG. 1 illustrates an exemplary telecommunication system.

FIG. 1 shows an illustrative telecommunication system 100 that may be used to implement the disclosed beamforming techniques. The telecommunication system 100 comprises a base station 102 and a plurality of wireless terminals 112, 114, and 116. The base station 102 has $N_T$ transmit antennas 104 and communicates with K wireless terminals 112, 114, and 116 respectively. As used herein, the use of "$N_T$" or a capital "K" refers to a specific designation of a number of antennas or wireless terminals respectively. For example, in a base station with five transmit antennas 104, $N_T=5$. Similarly, in a system with eight wireless terminals, K=8. As depicted in FIG. 1, the number of wireless terminals is less than or equal to the number of transmit antennas 104, that is, $K \leq N_T$. Each of the wireless terminals 112, 114, or 116 may be a mobile wireless terminal, such as a cell phone, or a fixed wireless terminal. Each of the wireless terminals 112, 114, and 116 have at least one receiving antenna 112A, 114A, and 116A for receiving communications from the base station 102. Also, the wireless terminals 112, 114, and 116 share the same frequency band by means of spatial division multiple access. Spatial division multiple access is a communication technique that takes advantage of the spatial diversity of wireless terminals 112, 114, and 116. That is, each of the wireless terminals 112, 114, and 116 may be at mutually exclusive locations. Using beamforming, the directionality of transmitted signals may be controlled by the base station 102 such that the base station 102 may communicate with multiple spatially diverse wireless terminals 112, 114, and 116 on the same frequency band.

As discussed above, beamforming is the process of using an array of antennas to control the direction of a transmitted signal. The base station 102 may transmit input data symbols to a desired wireless terminal in accordance with a steering vector used to make a beamformed communication. The steering vector indicates how each of the transmit antennas 104 transmits data such that a group of constructively interfering signals is directed to a wireless terminal. The way in which the steering vector carries the symbol is called a signal vector. As a signal vector traverses the space between the base station 102 and a wireless terminal, the transmission medium impacts the transmitted signal vector. The way in which the transmission medium impacts the signal vector is represented as a channel. A signal that is received at a wireless terminal includes the signal vector as impacted by the channel as well as any noise that is received. The noise may include signals intended for other wireless terminals as well as background noise picked up by the antenna of the wireless terminal. The strength of the signal received at the wireless terminal is impacted by the amount of power allocated to the signal at the base station 102. By varying the power allocated at the base station 102, the strength of the signals received at wireless terminals is likewise varied. A more detailed description of the beamforming process is described below.

The base station 102 communicates with each of the wireless terminals 112, 114, and 116 via communications channels $h_1$ 106, $h_k$ 108, and $h_K$ 110. The communication channels $h_1$ 106, $h_k$ 108, and $h_K$ 110 represent the path that a signal takes over a communication medium from the transmit antennas 104 to one of the receiving antennas 112A, 114A, or 116A. As used herein, the use of a lower-case "k" refers to a general designation of various groups of like items, such as a general designation of a communication channel or a wireless terminal, for example. The communication channels $h_1$ 106, $h_k$ 108, and $h_K$ 110 are assumed to be with flat fading. Fading refers to the variation of a transmitted signal caused by changes in the communication medium, wherein flat fading indicates that fading occurs proportionally for all frequency components of a received signal. The complex channel gain corresponding to the i'th transmit antenna at the base station and k'th wireless terminal 114 is denoted as $h_{ik}$. For example, the channel from the first transmit antenna 104 to the first wireless terminal 112 is denoted as $h_{11}$. Each of the channels, $h_{ik}$, may be a circular complex Gaussian function with zero mean, have unit variance, and be independent for different i's or k's.

As discussed above, the CSI is used by the base station 102 for beamforming. The CSI may be fed back from each wireless terminal 112, 114, and 116 to the base station 102 using any techniques known to those skilled in the art. For example, the CSI may be fed back using a time divisional duplex (TDD) system. In a TDD system, the uplink communication for communicating the CSI to the base station 102 is in the same frequency band as the downlink communication from the base station 102. To prevent interference, uplink and downlink communication occur at different times. Alternatively, the CSI may be estimated at the wireless terminal and fed back to the base station 102 through any appropriate feedback technique.

The CSI refers to the mathematical representation of a signal channel, $h_{ik}$. Due to various problems, such as channel estimation error, quantization error (for low data rate feedback), and delay in feedback, the CSI available at the base station for beamforming is imperfect and can be expressed as:

$$\hat{h}_{ik} = h_{ik} + e_{ik},$$

where $\hat{h}_{ik}$ is the CSI assuming error, $h_{ik}$ is the actual CSI, and $e_{ik}$ is the error in the CSI. The error, $e_{ik}$, may be a complex Gaussian function with zero mean and variance $\sigma_h^2$, independent of $h_{ik}$, and independent, identically distributed (i.i.d.) for different i's and k's. If each component of the CSI for all of the channels is expressed in matrix form as:

$$\hat{h}_k = \begin{pmatrix} \hat{h}_{1k} \\ \vdots \\ \hat{h}_{N_T k} \end{pmatrix}, h_k = \begin{pmatrix} h_{1k} \\ \vdots \\ h_{N_T k} \end{pmatrix}, \text{ and } e_k = \begin{pmatrix} e_{1k} \\ \vdots \\ e_{N_T k} \end{pmatrix}, \quad (1)$$

then:

$$\hat{h}_k = h_k + e_k. \quad (2)$$

Figure 2:
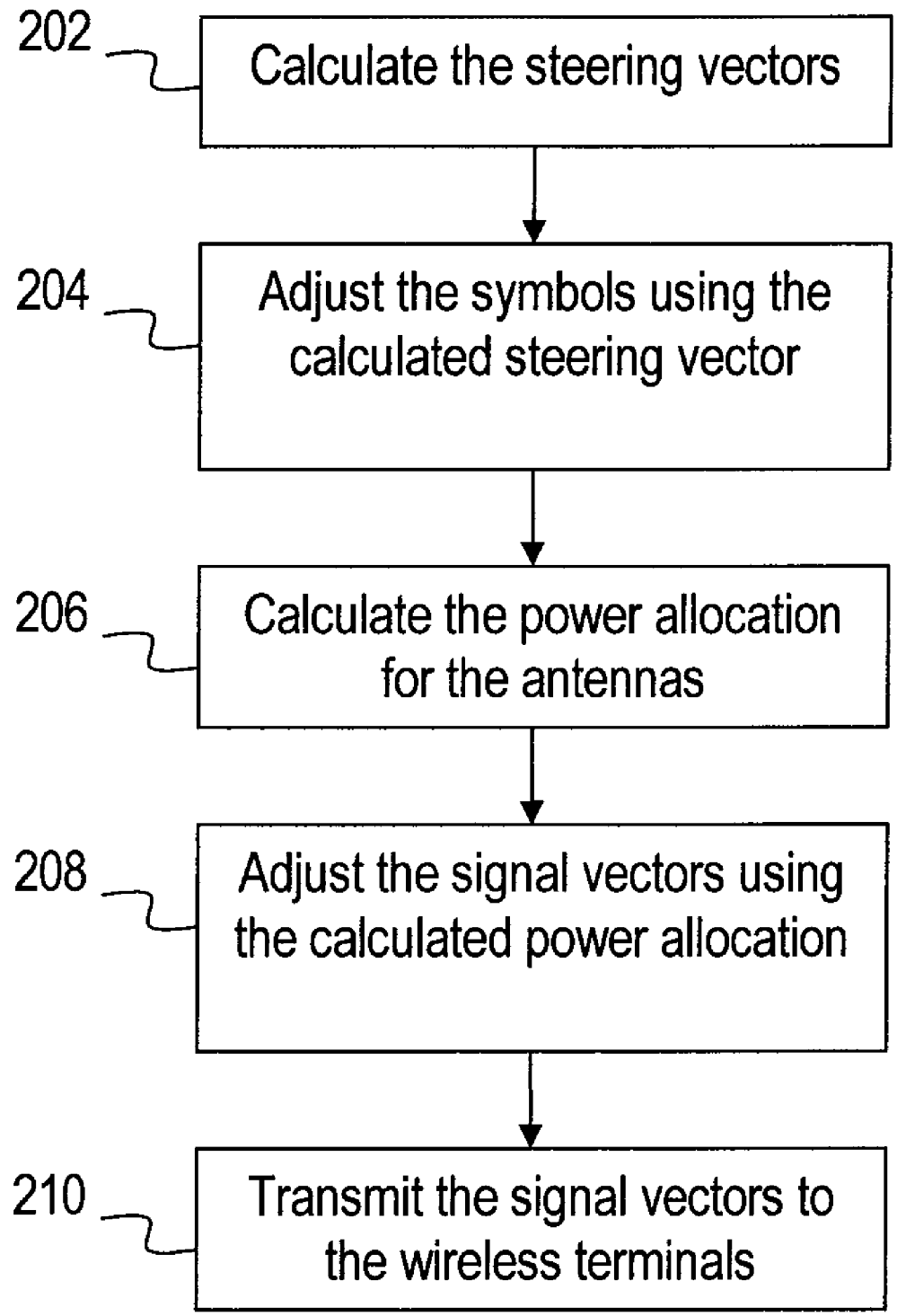
FIG. 2 illustrates an exemplary process for implementing one embodiment of the beamforming method.

FIG. 2 depicts an illustrative beamforming process according to an embodiment of the disclosure that takes into account the imperfect CSI. In block 202, the steering vector is calculated for each wireless terminal to increase the desired signal power and the overall power of interference to other wireless terminals. In block 204, the symbols that are to be transmitted are adjusted in accordance with the steering vector calculated in block 202 to obtain a signal vector. In block, 206 the power allocation is calculated for each antenna to increase the signal-to-interference-plus-noise ratio (SINR) for all wireless terminals for a given total amount of transmission power available at the base station 102. In block, 208 the signal vectors obtained in block 204 are adjusted in accordance with the power allocation calculated in block 206. In block 210, the signal vectors are transmitted by the transmit antennas 104 to the wireless terminals 112, 114, and 116. While a particular order is illustrated in FIG. 2 for the above process, the order is not limiting. For example, blocks 206 and 208 may be performed prior to or at the same time as blocks 202 and 204. In an alternative embodiment, bocks 206 and 208 are optional. That is, the signals may simply be transmitted in accordance with the steering vector without the power allocation being applied to the transmitted signals. In this case the total transmission power available at the base station 102 would be evenly allocated to each of the transmit antennas 104. Each of the blocks in the process of FIG. 2 are described in more detail below.

Figure 3:
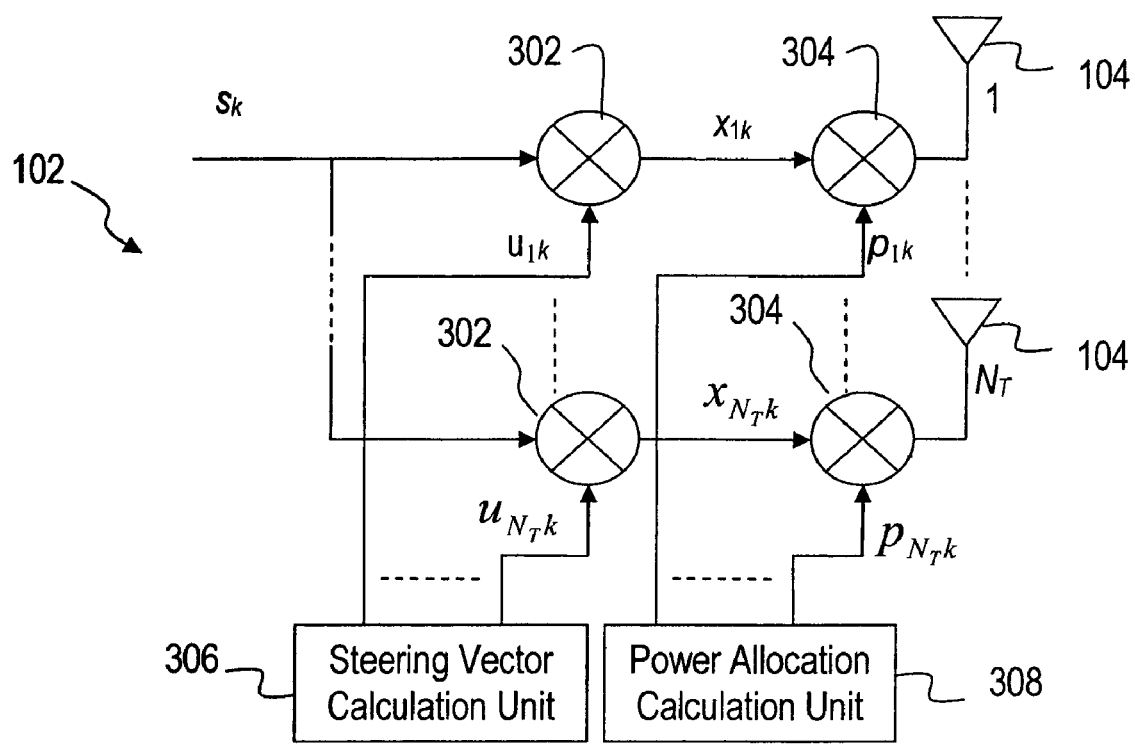
FIG. 3 illustrates an exemplary base station.

FIG. 3 depicts an illustrative base station 102 for accomplishing the beamforming process described above in conjunction with FIG. 2. The base station contains a steering vector calculation unit 306, a power allocation calculation unit 308, a plurality of adjustment units 302 and 304, and a plurality of antennas 104. Each of the adjustment units 302 and 304, as well as the antennas 104, are arranged in a parallel configuration as depicted in FIG. 3. As will be described in more detail below, the steering vector calculation unit 306 may be used to generate a steering vector that reduces the bit-error rate (BER) of received signals when imperfect CSI is available at the base station 102. Also described in more detail below, the power allocation calculation unit 308 may be used to adjust the signal strength of the signals transmitted by the antennas 104 to further reduce the BER of received signals when imperfect CSI is available at the base station 102.

As shown in FIGS. 1 and 3, the base station 102 has symbols $s_k$ as input data that is to be transmitted to the k'th wireless terminal 114. The symbols $s_k$ may be raw data or they may be encrypted to ensure a secure transmission of data. Further, the symbols $s_k$ may be embedded with error correcting code to enable a more reliable decoding of the data at the wireless terminal 114. The symbol $s_k$ may be i.i.d. and with zero mean and unit variance.

The base station 102 of FIG. 3 may comprise a steering vector calculation unit 306 for calculating a steering vector $u_k$ for the k'th wireless terminal 114. Looking back to FIG. 2, block 202 may be accomplished by the steering vector calculation unit 306. The steering vector $u_k$ indicates how each of the $N_T$ transmit antennas 104 transmit data such that a beamformed communication is sent to the k'th wireless terminal 114. The steering vector $u_k$ may be denoted as $u_k = (u_{1k}, \ldots, u_{N_T k})^T$, where $u_{1k}$ is the steering vector to be transmitted by the first transmit antenna 104 and $u_{N_T k}$ is the steering vector to be transmitted by the $N_T$'th transmit antenna 104.

The base station 102 of FIG. 3 may also comprise a plurality of adjustment units 302 for producing a signal vector, x. Looking back to FIG. 2, block 204 may be accomplished by the adjustment units 302. The signal vector x represents how the transmit antennas 104 transmit the symbols for all of the wireless terminals 112, 114, and 116 in accordance with the steering vector for all of the wireless terminals 112, 114, and 116. Each adjustment unit 302 shown in FIG. 3 produces a portion of the signal vector x for the k'th wireless terminal 114, $x_{lk} = u_{lk} s_k$ for $l=1, \ldots, N_T$, that is to be transmitted by the base station 102. Each portion of the signal vector $x_{lk}$ represents how the l'th transmit antenna 104 transmits the symbol $s_k$ in accordance with the steering vector $u_{lk}$. The transmitted signal vector x at the base station is a sum of the symbols $s_k$ transmitted in accordance with the steering vector $u_k$ for all of the wireless terminals 112, 114, and 116. The steering vector may be expressed as:

$$X = \sum_{k=1}^{K} u_k s_k, \tag{3}$$

where $s_k$ is the transmitted symbol for the k'th wireless terminal 114 and $u_k$ is the steering vector for the k'th wireless terminal 114.

The base station 102 of FIG. 3 may comprise a power allocation calculation unit 308. Looking back to FIG. 2, block 206 may be accomplished by the power allocation calculation unit 308. The power allocation calculation unit 308 is used to calculate a power allocation factor $p_{kk}$ to adjust the signal strength of the signals transmitted by the antennas 104, described in more detail below.

The base station 102 of FIG. 3 may comprise a plurality of adjustment units 304. Looking back to FIG. 2, block 208 may be accomplished by the adjustment units 304. The adjustment units 304 modify the signal vector $x_{lk}$ such that the power allocated to each portion of the signal vector $x_{lk}$ may be adjusted in accordance with a power allocation factor $p_{kk}$ calculated by the power allocation calculation unit 308.

Each wireless terminal 112, 114, and 116 may receive signals via their corresponding antennas 112A, 114A, and 116A. Upon traversing the communication channel, the signal received at the k'th wireless terminal 114 may be expressed as:

$$r_k = h_k^T u_k s_k + \sum_{l \neq k} h_k^T u_l s_l + n_k, \tag{4}$$

where the first term is the desired signal component at the k'th wireless terminal 114. The desired signal component represents how the transmitted signal vector x for the k'th wireless terminal 114 traversed the communication channel $h_k$. The second term of equation (4), $$\sum_{l \neq k} h_k^T u_l s_l,$$

is the multi-user interference (MUI) received at the k'th wireless terminal 114. The MUI represents how the sum of the transmitted signal vectors x for all of the other wireless terminals traversed the communication channel $h_k$ and is received by the k'th wireless terminal 114. The third term of equation (4), $n_k$, is the additive white Gaussian noise (AWGN) at the k'th wireless terminal 114, which may be with zero mean and variance $\sigma_n^2$. The MUI and the noise, $n_k$, are undesired signal components received at the k'th wireless terminal 114.

From the received signal in (4), the instantaneous signal-to-interference-plus-noise ratio (SINR) will be $$\gamma_k = \frac{|h_k^T u_k|^2}{\sum_{l \neq k} |h_k^T u_l|^2 + \sigma_n^2}. \tag{5}$$

The SINR represents the ratio of the magnitude of the desired signal component to the sum of the magnitude of the undesired signal components.

In accordance with one embodiment, beamforming with imperfect CSI and power allocation for further performance improvement are discussed below. At the base station 102, only imperfect CSI, $\hat{h}_k$ is observed; therefore, in accordance with (2) the desired signal component observed by the k'th wireless terminal 114 will be $$h_k^T u_k = (\hat{h}_k - e_k)^T u_k,$$

for the steering vector, $u_k$, as defined above. Consequently, given imperfect CSI at the base station, the average power of the desired signal component of the k'th wireless terminal 114 is $$\lambda_{kk} = E\left|(\hat{h}_k - e_k)^T u_k\right|^2 \qquad (6)$$
$$= \left|\hat{h}_k^T u_k\right|^2 + \sigma_h^2 \|u_k\|^2.$$

Similarly, the interference power at the k'th wireless terminal 114 from the transmitted symbol for the n'th wireless terminal can be found to be $$\lambda_{nk} = \left|\hat{h}_k^T u_n\right|^2 + \sigma_h^2 \|u_n\|^2. \qquad (7)$$

In order to provide a steering vector that accounts for imperfect CSI, the steering vector, $u_k$ for $k=1, \ldots, K$, may be determined to increase a low value of the SINR. That is, choose $u_k$ for $k=1, \ldots, K$ to increase $$\gamma(u_1, \ldots, u_K) = \min_{1 \le k \le K} \left\{ \frac{\lambda_{kk}}{\sum_{l \ne k} \lambda_{lk} + \sigma_n^2} \right\}.$$

In this embodiment, the steering vector calculation unit 306 may accomplish block 202 by increasing the above equation.

Alternatively, rather than solving the equation above, each steering vector may be chosen to increase the ratio of the signal-to-leakage ratio (SLR), that is to increase $$\gamma_k(u_k) = \frac{\lambda_{kk}}{\sum_{l \ne k} \lambda_{kl}}. \qquad (8)$$

The numerator of (8), $\lambda_{kk}$, represents the average power of the desired signal component of the k'th wireless terminal 114 transmitted to the k'th wireless terminal 114. The denominator of (8), $$\sum_{l \ne k} \lambda_{kl},$$

represents the sum of the average interference power for the signal of the k'th wireless terminal 114 transmitted to the other wireless terminals 112 and 116. Therefore, the SLR represents the ratio of the average power of the desired signal component of the k'th wireless terminal 114 to sum of the average interference power for transmitting the signal of the k'th wireless terminal 114 to the other wireless terminals 112 and 116. Using (6) and (7) to take into account the imperfect CSI observed at the base station 102, (8) can be expressed as $$\gamma_k(u_k) = \frac{\left|\hat{h}_k^T u_k\right|^2 + \sigma_h^2 \|u_k\|^2}{\sum_{l \ne k} \left(\left|\hat{h}_l^T u_k\right|^2 + \sigma_h^2 \|u_k\|^2\right)} \qquad (9)$$
$$= \frac{u_k^H R_{sk} u_k}{u_k^H R_{ik} u_k},$$

where $$R_{sk} = \hat{h}_k * \hat{h}_k^T + \sigma_h^2 I,$$

and $$R_{ik} = \sum_{l \ne k} \hat{h}_l * \hat{h}_l^T + (K-1)\sigma_h^2 I.$$

It can be seen that if $\sigma_h^2 \ne 0$, then both $R_{sk}$ and $R_{ik}$ are positive definite. Let the eigen-decomposition of $R_{ik}$ be $$R_{ik} = U_k \begin{pmatrix} d_{1k}^2 & 0 & \cdots & 0 \\ 0 & d_{2k}^2 & \ddots & 0 \\ \vdots & \ddots & \ddots & \vdots \\ 0 & 0 & \cdots & d_{Kk}^2 \end{pmatrix} U_k^H,$$

where $d_{ik}$ are all non-zero and $U_k$ is a unitary matrix. Denote $$v_k = D_k U_k^H u_k,$$

or $$u_k = U_k D_k^{-1} v_k,$$

where $$D_k = \begin{pmatrix} d_{1k} & 0 & \cdots & 0 \\ 0 & d_{2k} & \ddots & 0 \\ \vdots & \ddots & \ddots & \vdots \\ 0 & 0 & \cdots & d_{Kk} \end{pmatrix} \text{ and } D_k^{-1} = \begin{pmatrix} d_{1k}^{-1} & 0 & \cdots & 0 \\ 0 & d_{2k}^{-1} & \ddots & 0 \\ \vdots & \ddots & \ddots & \vdots \\ 0 & 0 & \cdots & d_{Kk}^{-1} \end{pmatrix}.$$

Then $$\gamma_k(u_k) = \frac{v_k^H D_k^{-1} U_k^H R_{sk} U_k D_k^{-1} v_k}{\|v_k\|^2}.$$

Let $\gamma_{ok}$ be the largest eigen-value of $D_k^{-1} U_k^H R_{sk} U_k D_k^{-1}$ and $v_{ok}$ be the corresponding eigen-vector. Then the SLR, $\gamma_k(u_k)$, reaches a high value, $\gamma_{ok}$, when $u_k$ is:

$$u_{ok} = U_k D_k^{-1} v_{ok}. \qquad (10)$$

The vector calculated from (10) may not necessarily be normalized, however the steering vector can be obtained by normalizing $u_{ok}$. As such, the steering vector calculation unit 306 may accomplish block 202 by calculating and normalizing $u_{ok}$ as defined above to obtain a steering vector that increases the SLR when imperfect CSI is available at the base station 102.

Discussed above is a steering vector optimization for each wireless terminal to increase the desired signal power and the overall power of interference to other wireless terminals. In order to further optimize the whole telecommunication system 100, the transmission power allocated to the signals to be transmitted to each of the wireless terminals 112, 114, and 116 is also optimized. When determining the steering vector above, the power allocated to the signal for each wireless terminal 112, 114, and 116 was equal. This may not be optimal since some of the wireless terminals may have a higher SINR than others.

In the case that some wireless terminals have a higher SINR than others power may be wasted. The power may be wasted by assigning unnecessary amounts of power to the signals for wireless terminals with high SINR and not enough power for signals of wireless terminals with low SINR. Also, the interference caused by signals transmitted to wireless terminals with high SINR may be reduced if the power allocated to those signals is reduced. Since the SINR of those wireless terminals was already high, then the SINR of the signal may be reduced without adversely impacting the received signal. In this case the power allocated to the signals may be reduced to reduce the SINR. By reducing the power allocated to the signals with a high SINR, the interference caused by these signals is also reduced. Therefore, in order to optimize the power, the SINR for all of the wireless terminals is to be increased. This is accomplished by increasing the SINR of wireless terminals with low SINR and decreasing the SINR of wireless terminals with high SINR, until the SINR of all wireless terminals is equal as discussed in detail below.

According to one embodiment, the average transmission power of each wireless terminal is unit. As such, for a system with K wireless terminals, the total transmission power will be K. Let the transmission power for a signal transmitted to the k'th wireless terminal 114 be $p_k$. Then $$\sum_{k=1}^{K} p_k = K \text{ and } p_k \rangle 0.$$

As before, $\lambda_{lk}$ is the average power of interference and $\lambda_{kk}$ is the average power of the desired signal when the optimum steering vector is used. Then the SINR for the k'th wireless terminal will be $$\gamma_k(p_1, \ldots, p_K) = \frac{p_k \lambda_{kk}}{\sum_{l \neq k} p_l \lambda_{lk} + \sigma_n^2}$$

In order to optimize the power allocation, the power distribution may be adjusted to increase the lowest SINR of all of the wireless terminals, $\gamma_k(p_1, \ldots, p_K)$, as long as the SINR for all of the wireless terminals is not already equal. As a result, all $\gamma_k(p_{o1}, \ldots, p_{oK})$'s must be equal for optimal power allocation. For example, if there are four wireless terminals, then each wireless terminal will have a SINR, that is there will be a SINR $\gamma_1$, $\gamma_2$, $\gamma_3$, and $\gamma_4$. If in this example $\gamma_1 > \gamma_2 > \gamma_3 > \gamma_4$, then the fourth wireless terminal has the lowest SINR. As stated above, in order to optimize the power allocation of the base station 102, the lowest SINR is to be increased. In this example, the SINR of the fourth wireless terminal is increased by increasing the power allocated to the fourth wireless terminal until the SINR of the fourth wireless terminal equals the SINR of the third wireless terminal, that is $\gamma_3 = \gamma_4$. Upon the SINR of the third and fourth wireless terminal equaling each other, the power allocated to both of the fourth and third wireless terminal will be increased equally until the SINR of all of the wireless terminals are equal, that is $\gamma_1 = \gamma_2 = \gamma_3 = \gamma_4$. Since the base station 102 only has a given amount of total power, when assigning more power to the fourth wireless terminal, then less power will be assigned to the first wireless terminal. For example, if $\gamma_4$ is initially $\gamma_{o4}$ and, $\gamma_1 = 10\gamma_{o4}$, $\gamma_2 = 7\gamma_{o4}$, and $\gamma_3 = 3\gamma_{o4}$, then the power may be adjusted such that power is increased to the fourth wireless terminal until $\gamma_4 = 5\gamma_{o4}$, power is increased to the third wireless terminal until $\gamma_3 = 5\gamma_{o4}$, power is decreased from the second wireless terminal until $\gamma_2 = 5\gamma_{o4}$, and power is decreased from the first wireless terminal until $\gamma_1 = 5\gamma_{o4}$.

Therefore, the optimal SINR, $\gamma_o$, and power allocation can be obtained by the following identities $$p_{ok}\lambda_{kk} = \gamma_o \sum_{l \neq k} p_{ol}\lambda_{lk} + \gamma_o \sigma_n^2, \quad (11)$$

for $k = 1, \ldots, K$ and $$\sum_{k=1}^{K} p_{ok} = K.$$

Denote $$\Lambda_d = diag\{\lambda_{11}, \cdots, \lambda_{KK}\},$$

$$\Lambda = \begin{pmatrix} \lambda_{11} & \cdots & \lambda_{K1} \\ \vdots & \ddots & \vdots \\ \lambda_{1K} & \cdots & \lambda_{KK} \end{pmatrix},$$

and the optimal power allocation vector $$p_o = (p_{o1}, \ldots, p_{oK})^T.$$

Then (11) can be expressed into a more compact form as $$\left(\left(1 + \frac{1}{\gamma_o}\right)\Lambda_d - \Lambda\right)p_o = \sigma_n^2 \mathbf{1}, \quad (12)$$

and $$\mathbf{1}^T p_o = K,$$

where $$\mathbf{1} = \underbrace{(1, \cdots, 1)^T}_{K1's}.$$

From (12), $$p_o = \sigma_n^2 \left(\left(1 + \frac{1}{\gamma_o}\right)\Lambda_d - \Lambda\right)^{-1} \mathbf{1}. \quad (13)$$

Then the optimal SNIR ($\gamma_o$) is determined by the following identity $$\sigma_n^2 \mathbf{1}^T \left(\left(1 + \frac{1}{\gamma_o}\right)\Lambda_d - \Lambda\right)^{-1} \mathbf{1} = K. \quad (14)$$

Once $\gamma_o$ is determined by (14), the optimal power allocation can be found from (13). As such, the power allocation calculation unit 306 may accomplish block 206 by calculating the power allocation as defined above to increase the SINR for all of the wireless terminals.

In an alternative embodiment, when the telecommunication system 100 is interference limited, that is, the signal to noise ratio is very large and $\sigma_n^2 \approx 0$, the optimum power allocation approach can be simplified. In that case, denote $$\tilde{p}_o = \Lambda_d p_o,$$

and $$\tilde{\Lambda} = \Lambda \Lambda_d^{-1}.$$

Then (12) turns into $$\left(1 + \frac{1}{\gamma_o}\right)\tilde{p}_o = \tilde{\Lambda}\tilde{p}_o$$

Note that $\tilde{\Lambda}$ is a non-negative matrix. There is an nonnegative vector, $\tilde{p}_o$, with $\tilde{p}_{ok} \geq 0$ for k=1, ..., K such that $$\rho\tilde{p}_o = \tilde{\Lambda}\tilde{p}_o$$

Then the optimum power allocation will be $$p_o = \tilde{\Lambda}_d^{-1}\tilde{p}_o$$

and the optimum signal-to-interference ratio (SIR) in this case will be $$\gamma_o = \frac{1}{\rho - 1}.$$

As such, the power allocation calculation unit 306 may accomplish block 206 by calculating the power allocation as defined above to increase the SINR for all of the wireless terminals. While the power allocation was calculated above to increase the SINR of all of the wireless terminals, the power allocation may also be calculated by decreasing the total transmission power for a given SINR constraint of each wireless terminal 112, 114, and 116.

EXAMPLES

The examples shown in FIGS. 4A, 4B, 5A, 5B, 6A, and 6B demonstrate the computer simulated performance of the disclosed system and method, indicated by the line with the circle, as compared to a system that does not account for imperfect CSI at the base station 102, indicated by the line with the star. In the simulation, channel gains corresponding to different pairs of transmit and receive antennas, $h_{ik}$'s, are assumed to be independent, complex (circular) Gaussian functions with zero mean and unit variance and only imperfect CSI is available at the transmitter for downlink beamforming. The transmitted symbols are independent and are randomly drawn from 4-QAM constellations, $$\left\{\pm\frac{1}{\sqrt{2}} \pm j\frac{1}{\sqrt{2}}\right\},$$

each with the same probability.

Figure 4A:
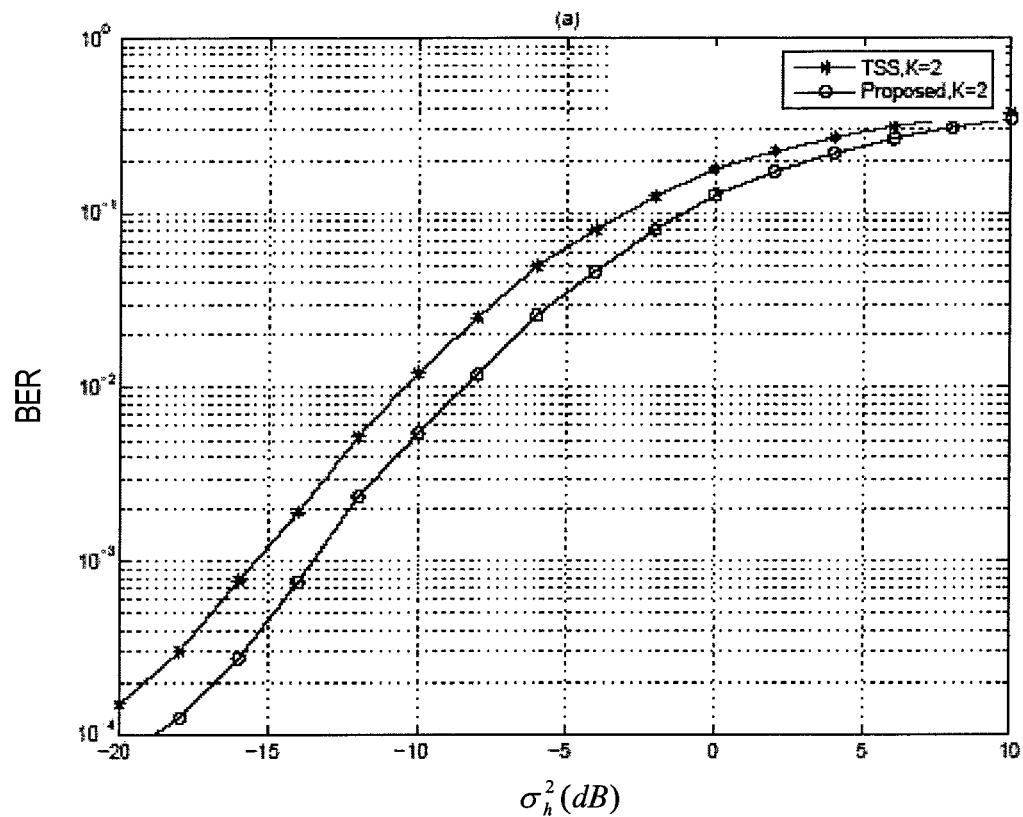
FIGS. 4A-4B illustrate exemplary computer simulation results of one embodiment showing the increased performance when taking into account imperfect CSI.
Figure 4B:
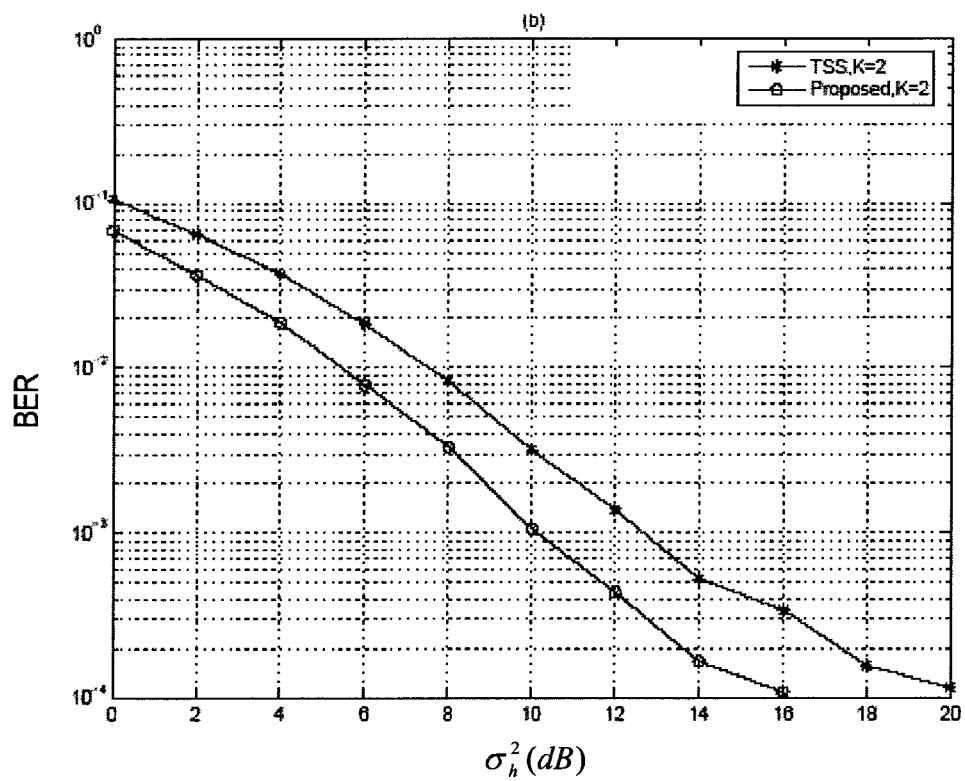
Figure 5A:
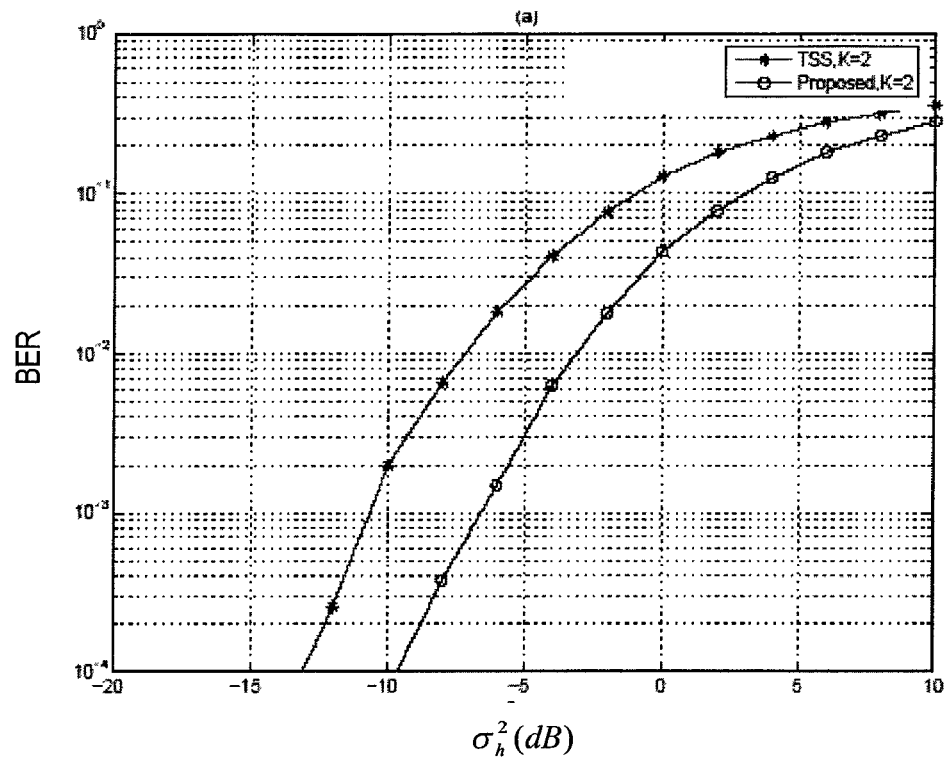
FIGS. 5A-5B illustrate exemplary computer simulation results of another embodiment showing the increased performance when taking into account imperfect CSI.
Figure 5B:
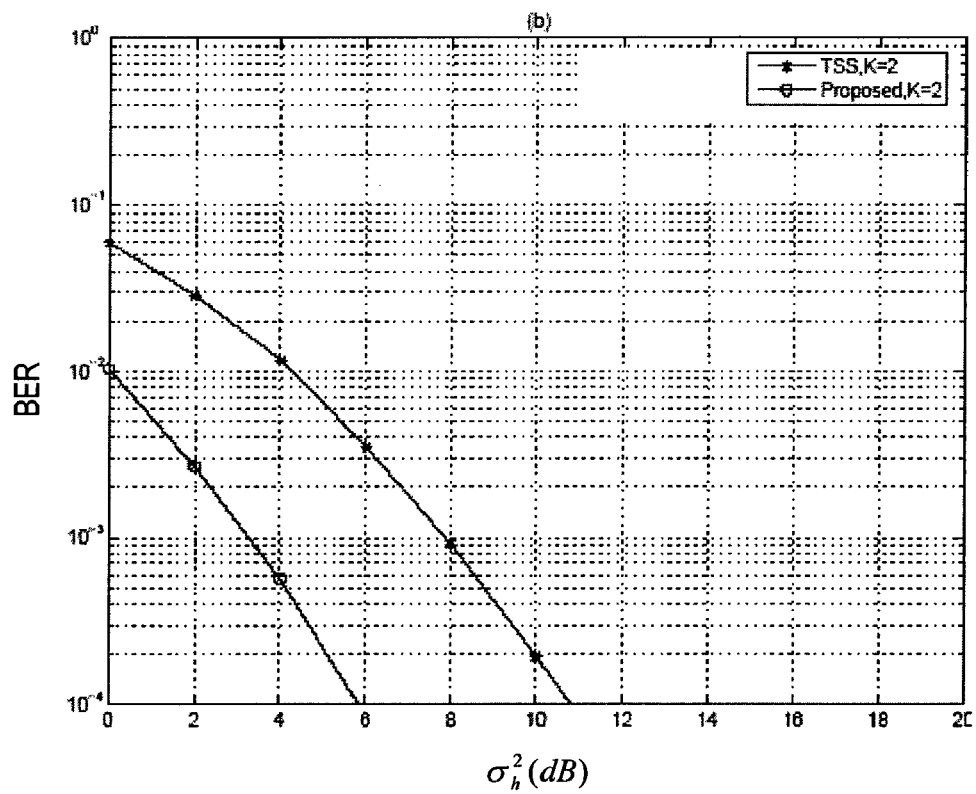
Figure 6A:
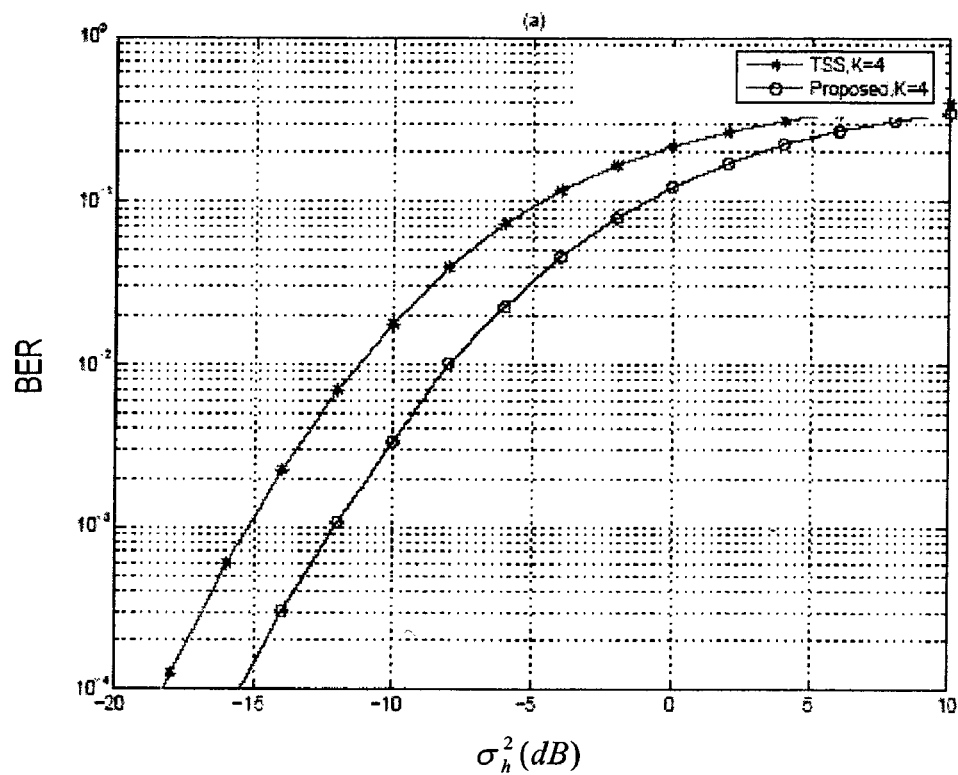
FIGS. 6A-6B illustrate exemplary computer simulation results of another embodiment showing the increased performance when taking into account imperfect CSI.
Figure 6B:
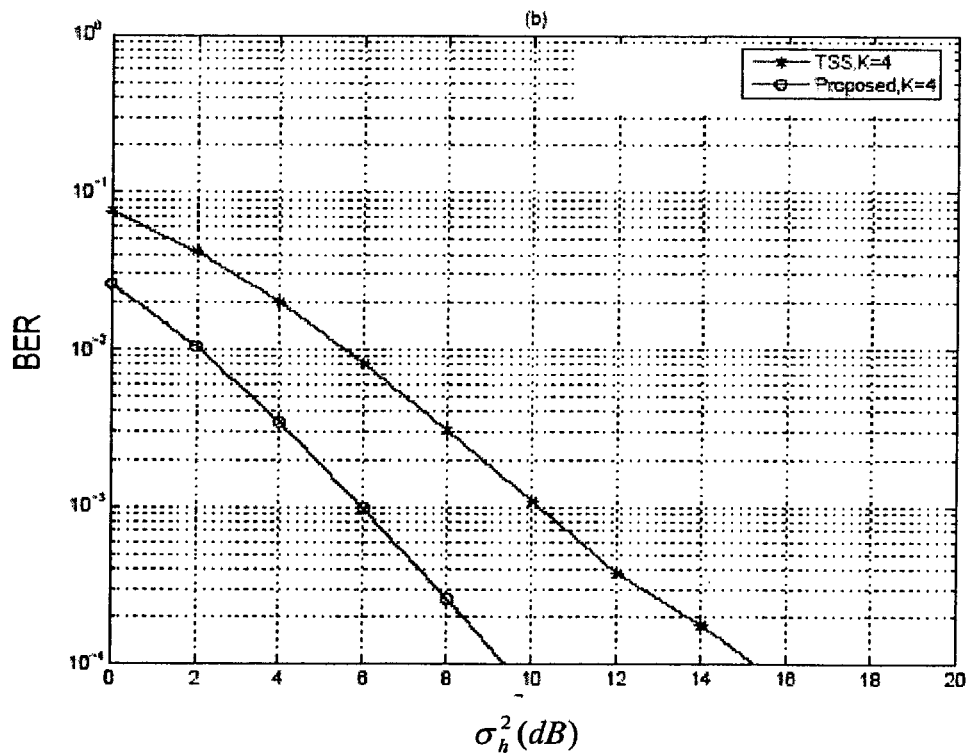

From FIGS. 4A, 4B, 5A, 5B, 6A, and 6B, it can be see that the disclosed system and method is more robust to CSI ambiguity. FIGS. 4A and 4B depict the performance of downlink beamforming for a system with $N_T=4$ transmit antennas and K=2 wireless terminals. FIG. 4A shows the BER versus CSI ambiguity when SNR=20 dB. FIG. 4B shows the BER versus SNR when $\sigma_h=-20$ dB. From FIGS. 4A and 4B, it is seen that the required SNR for a 1% BER is reduced by over 2 dB compared with the system that does not account for CSI at the base station 102 for a system with $N_T=4$ transmit antennas, K=2 wireless terminals, and $\sigma_h=-20$ dB. The performance gain increases with the number of transmit antennas when the number of wireless terminals is fixed as shown in FIGS. 5A and 5B. FIGS. 5A and 5B show the performance of downlink beamforming for a system with NT=8 transmit antennas and K=2 wireless terminals. FIG. 5A depicts the BER versus CSI ambiguity when SNR=20 dB and FIG. 5B depicts the BER versus SNR when $\sigma_h=-20$ dB. As shown in FIGS. 5A and 5B, the required SNR for a 1% BER is reduced by over 4 dB if the number of transmit antennas is changed into $N_T=8$ in the above environment. If the number of transmit antennas is fixed and the number of wireless terminals is increased, then the performance gain will be reduced, as can be see from comparing FIGS. 5A and 5B with FIGS. 6A and 6B. FIGS. 6A and 6B depict the performance of beamforming for a system with $N_T=8$ transmit antennas and K=4 wireless terminals. FIG. 6A depicts the BER versus CSI ambiguity when SNR=20 dB and FIG. 6B depicts the BER versus SNR when $\sigma_h=-20$ dB.

Figure 7A:
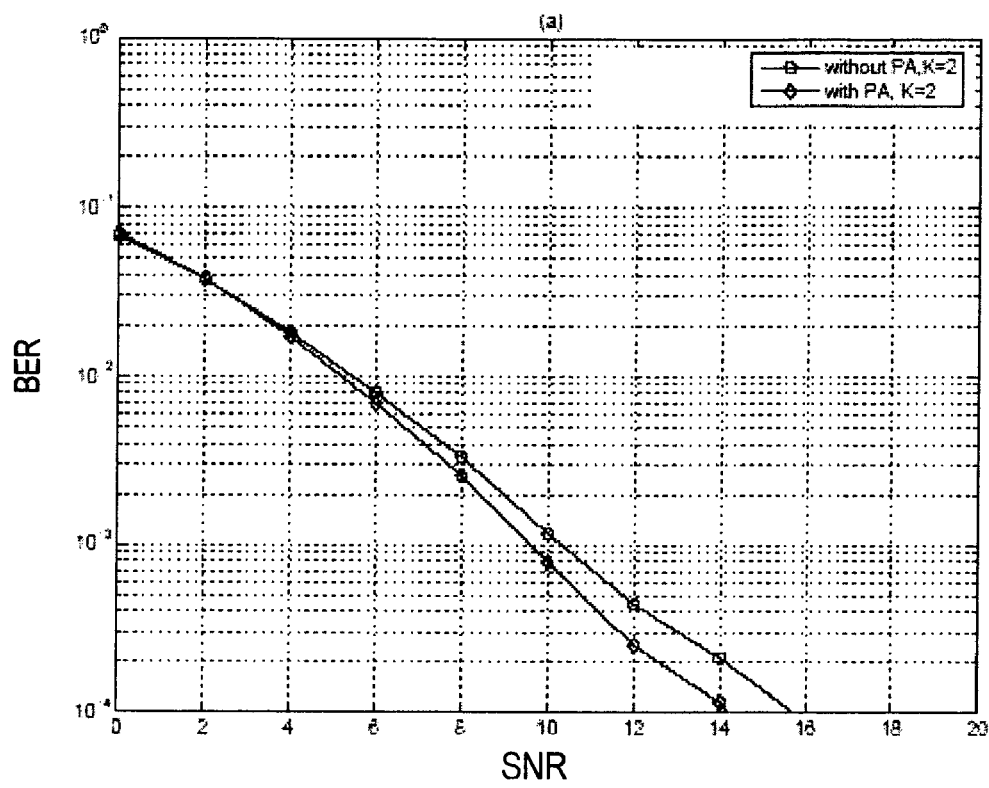
FIGS. 7A-7B illustrate exemplary computer simulation results of one embodiment showing the increased performance when allocating power.
Figure 7B:
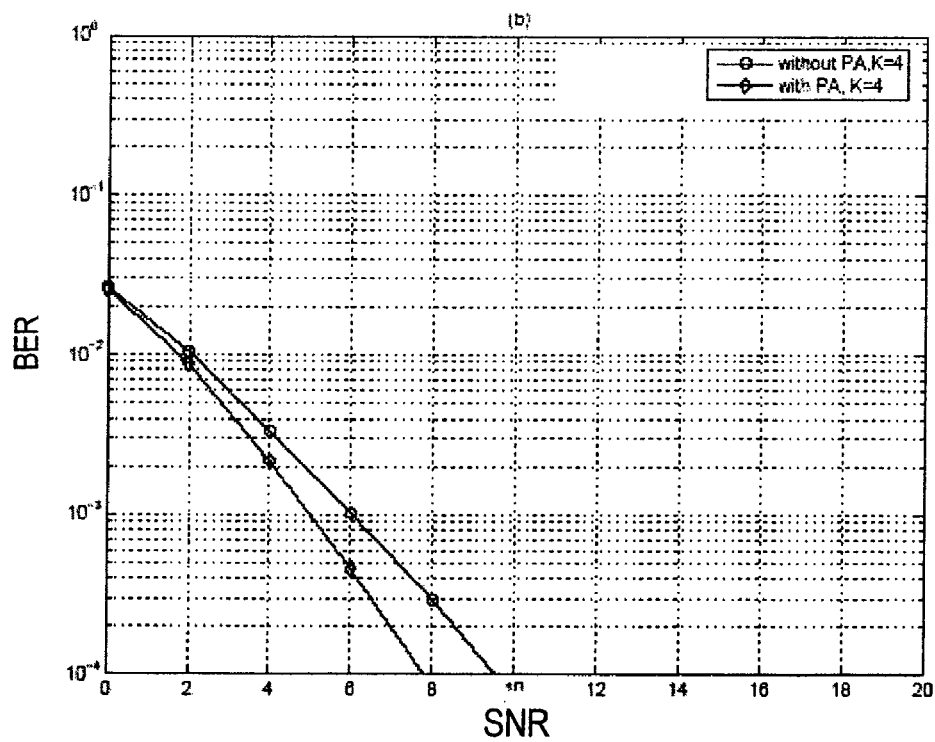

FIG. 7A depicts the impact of adaptive power allocation on a system with $N_T=4$ transmit antennas and K=2 wireless terminals and FIG. 7B depicts the impact of adaptive power allocation on a system with $N_T=8$ transmit antennas and K=4 wireless terminals when $\sigma_h=-10$ dB. FIGS. 7A and 7B depict the BER versus the SNR with the line indicated by the square representing no power allocation, and the line indicated by the diamond representing power allocation as disclosed above. As shown in FIGS. 7A and 7B, performance improvement is gained through power allocation with imperfect CSI for a system with different numbers of transmit antennas and wireless terminals when $\sigma_h=-20$ dB. From FIGS. 7A and 7B, it can be see that there is performance improvement, especially when the SNR is high.

Described above is a system and method for downlink beamforming that takes into account imperfect channel state information (CSI) at the transmitter when determining the steering vector used in the beamforming process. As was seen in the exemplary results, by accounting for imperfect CSI when calculating the steering vector, the bit-error rate for a given signal-to-noise ratio is decreased. The performance gain was further increased by increasing the number of transmit antennas while the number of wireless terminals remains fixed. Also disclosed above is a power allocation method that improves performance of the system by increasing the signal-to-interference-plus-noise ratio for all of the wireless terminals currently communicating with the base station. The power allocation was similarly seen to decrease the bit-error rate for a given signal-to-noise ratio, especially at high signal-to-noise ratios.

Figure 8:
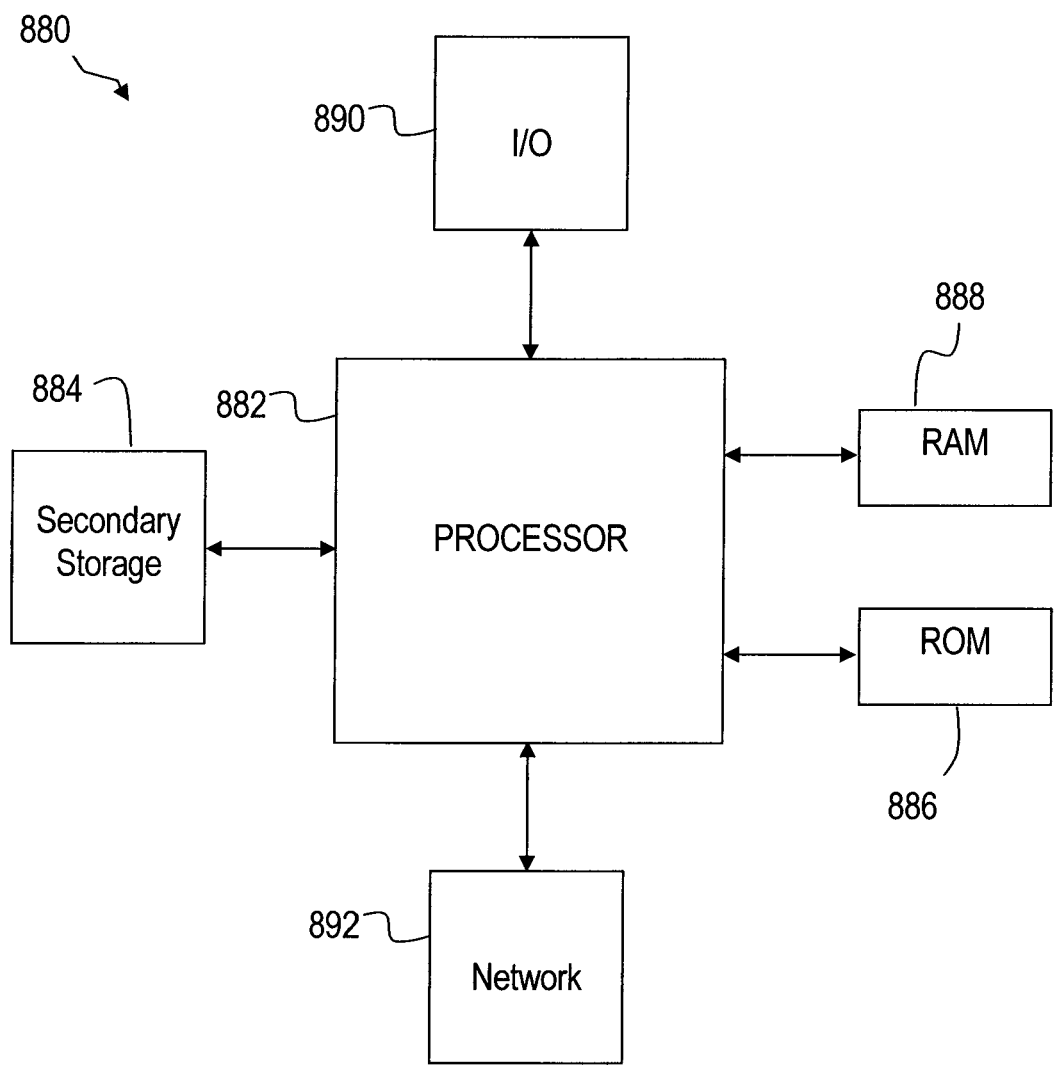
FIG. 8 illustrates an exemplary general purpose computer system suitable for implementing the several embodiments of the disclosure.

The steering vector calculation unit 306, the power allocation calculation unit 308, and/or all of the other telecommunication network components in the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) 890 devices, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. The various elements or components may be combined or integrated in another system or certain features may be omitted, or not implemented. For example, while downlink beamforming is described above, it is also contemplated that the disclosed system may be modified to implement uplink beamforming as well.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A telecommunication network component, comprising:
a memory configured to store instructions; and
a processor configured to execute the stored instructions, the instructions comprising:
determining a steering vector that accounts for imperfect channel state information, and
outputting the steering vector to be applied to a symbol to be transmitted, wherein the steering vector is calculated to increase a signal-to-leakage ratio, wherein:
the signal-to-leakage ratio is calculated according to:

$$\gamma_k(u_k) = \frac{\left|\hat{h}_k^T u_k\right|^2 + \sigma_h^2\|u_k\|^2}{\sum_{l \neq k}\left(\left|\hat{h}_l^T u_k\right|^2 + \sigma_h^2\|u_k\|^2\right)},$$

where $\gamma_k$ is the signal-to-leakage ratio, $u_k$ is the steering vector, $\hat{h}_k$ is a k'th channel assuming error in channel, $\hat{h}_l$ is other channels that are not the k'th channel, and $\sigma_h$ is a variance of the error in the channel.

2. The telecommunication network component of claim 1, wherein the steering vector is calculated to increase a signal-to-leakage ratio.

3. The telecommunication network component of claim 1, wherein the instructions further comprise:
determining an amount of transmission power allocated among the plurality of wireless terminals such that a signal-to-interference-plus-noise ratio of at least one of the wireless terminals is increased.

4. The telecommunication network component of claim 3, wherein the instructions further comprise:
outputting a power allocation determined by the step of determining the amount of transmission power to a signal vector to be transmitted.

5. A telecommunication network component, comprising:
a memory configured to store instructions; and
a processor configured to execute the stored instructions, the instructions comprising:
determining a steering vector that accounts for imperfect channel state information, and
outputting the steering vector to be applied to a symbol to be transmitted, wherein the instructions further comprise determining an amount of transmission power allocated among a plurality of wireless terminals such that a signal-to-interference-plus-noise ratio of at least one of the wireless terminals is increased, wherein:
an optimal signal-to-interference-plus-noise ratio is calculated in accordance with:

$$\sigma_n^2 1^T \left( \left(1 + \frac{1}{\gamma_o}\right) \Lambda_d - \Lambda \right)^{-1} 1 = K,$$

where $\gamma_o$ is the optimal signal-to-interference-plus-noise ratio, K is a number of the wireless terminals, $\sigma_n$ is a variance of additive white Gaussian noise, 1 is a matrix of K 1's $\Lambda_d$ is a diagonal matrix of an average power of K signals, $\Lambda$ is a square matrix of the average power of the K signals.

6. The telecommunication network component of claim 5, wherein:
an optimal power allocation is calculated in accordance with:

$$p_o = \sigma_n^2 \left( \left(1 + \frac{1}{\gamma_o}\right) \Lambda_d - \Lambda \right)^{-1} 1,$$

where $p_o$ is the optimal power allocation, $\gamma_o$ is the optimal signal-to-interference-plus-noise ratio, $\sigma_n$ is the variance of additive white Gaussian noise, 1 is the matrix of K 1's, $\Lambda_d$ is the diagonal matrix of the average power of K signals, $\Lambda$ is the square matrix of the average power of the K signals.

7. A beamforming method comprising:
for each terminal of a plurality of wireless terminals, determining a steering vector that accounts for imperfect channel state information, the plurality of wireless terminals communicating with a telecommunication network component having an array of transmit antennas;
determining a power allocation that increases a signal strength of at least one signal directed to one of a plurality of wireless terminals; and
transmitting at least one symbol in accordance with the steering vector and the power allocation, wherein the steering vector is determined to increase a desired signal power directed to one of the plurality of wireless terminals as compared with an overall power of interference directed to other users, wherein the steering vector is calculated to increase a signal-to-leakage ratio, wherein the signal-to-leakage ratio is calculated according to:

$$\gamma_k(u_k) = \frac{\left|\hat{h}_k^T u_k\right|^2 + \sigma_h^2 \|u_k\|^2}{\sum_{l \neq k} \left( \left|\hat{h}_k^T u_k\right|^2 + \sigma_h^2 \|u_k\|^2 \right)},$$

where $\gamma_k$ is the signal-to-leakage ratio, $u_k$ is the steering vector, $\hat{h}_k$ is a k'th channel assuming error in channel, $\hat{h}_l$ is other channels that are not the k'th channel, and $\sigma_h$ is a variance of the error in the channel.

8. The beamforming method of claim 7, further comprising:
normalizing the steering vector.

9. The beamforming method of claim 7, wherein the power is allocated such that more power is allocated to a signal vector of a wireless terminal with a low signal-to-noise-plus-interference ratio than to a signal vector of a wireless terminal with a high signal-to-noise-plus-interference ratio.

10. The beamforming method of claim 9, wherein the power is allocated such that less power is allocated to a signal vector of a wireless terminal with a signal-to-noise-plus-interference ratio that is higher than at least one of the wireless terminals, than the power that would be allocated by evenly dividing a total amount of power to be allocated among signal vectors of the wireless terminals.

11. The beamforming method of claim 9, wherein the power is allocated such that more power is allocated to a signal vector of a wireless terminal with a signal-to-noise-plus-interference ratio that is lower than at least one of the wireless terminals, than the power that would be allocated by evenly dividing a total amount of power to be allocated among signal vectors of active users.

12. The beamforming method of claim 7, wherein signal-to-noise plus-interference ratios of the plurality of wireless terminals are equal to each other, and wherein the power allocated is determined to direct equal amounts of power to the plurality of the wireless terminals.

13. A system comprising:
a steering vector calculation unit configured to determine a steering vector that accounts for imperfect channel state information; and
an array of transmit antennas configured to transmit a signal in accordance with the calculated steering vector, wherein the steering vector comprises indices for each transmit antenna of the array of transmit antennas, wherein the steering vector is configured to increase a signal power directed to each terminal of the plurality of wireless terminals communicating with the system as compared with an overall power of interference directed to other terminals of the plurality of wireless terminals, wherein the steering vector is calculated to increase a signal-to-leakage ratio, wherein the signal-to-leakage ratio is calculated according to:

$$\gamma_k(u_k) = \frac{\left|\hat{h}_k^T u_k\right|^2 + \sigma_h^2 \|u_k\|^2}{\sum_{l \neq k} \left( \left|\hat{h}_k^T u_k\right|^2 + \sigma_h^2 \|u_k\|^2 \right)},$$

where $\gamma_k$ is the signal-to-leakage ratio, $u_k$ is the steering vector, $\hat{h}_k$ is a k'th channel assuming error in channel, $\hat{h}_l$ is other channels that are not the k'th channel, and $\sigma_h$ is a variance of the error in the channel.

14. The system of claim 13, further comprising:
an adjustment unit for applying the calculated steering vector to a symbol to generate a signal vector.

15. The system of claim 13, further comprising:
a power allocation calculation unit for determining an amount of power to allocate to the signal transmitted by the array of transmit antennas configured such that a signal-to-interference-plus-noise ratio for a wireless terminal is increased.

16. The system of claim 15, further comprising:
an adjustment unit for applying the determined power allocation to a signal vector.

17. The system of claim 15, wherein:
the signal is also transmitted in accordance with the power allocation.

18. The system of claim 13, further comprising:
a device with a single antenna configured to receive the transmitted signal.

19. The telecommunication network component of claim 1, wherein each element of the steering vector is chosen to increase a ratio between an average power of a signal for a wireless link with the terminal and a sum of an average interference power of the signal with other wireless links with the plurality of wireless terminals.

20. The telecommunication network component of claim 1, wherein each element of the steering vector is chosen to increase a ratio of an average power of a desired signal component transmitted for the terminal communicating with the telecommunication network component to a sum of an average interference power of the desired signal component at remaining wireless terminals of the plurality of wireless terminals communicating with the telecommunication network component.

21. The telecommunication network component of claim 1, wherein the steering vector comprises indices for each transmit antenna and for each wireless link with the plurality of wireless terminals.

22. The system of claim 13, wherein each element of the steering vector is chosen to increase a ratio of an average power of a desired signal component transmitted for a wireless terminal communicating with the system to a sum of an average interference power of the desired signal component at remaining wireless terminals communicating with the system.

23. The telecommunication network component of claim 5, wherein the instructions further comprise:
    outputting a power allocation determined by the step of determining the amount of transmission power to a signal vector to be transmitted.

24. A system comprising:
a steering vector calculation unit configured to determine a steering vector that accounts for imperfect channel state information; and
an array of transmit antennas configured to transmit a signal in accordance with the calculated steering vector, wherein the steering vector comprises indices for each transmit antenna of the array of transmit antennas, wherein the steering vector is calculated to increase a signal-to-leakage ratio, wherein:
the signal-to-leakage ratio is calculated according to:

$$\gamma_k(u_k) = \frac{\left|\hat{h}_k^T u_k\right|^2 + \sigma_h^2 \|u_k\|^2}{\sum_{l \neq k} \left(\left|\hat{h}_k^T u_k\right|^2 + \sigma_h^2 \|u_k\|^2\right)},$$

where $\gamma_k$ is the signal-to-leakage ratio, $u_k$ is the steering vector, $\hat{h}_k$ is a k'th channel assuming error in channel, $\hat{h}_l$ is other channels that are not the k'th channel, and $\sigma_h$ is a variance of the error in the channel.

* * * * *

UNITED STATES PATENT AND TRADEMARK OFFICE
CERTIFICATE OF CORRECTION

PATENT NO. : 8,112,038 B2
APPLICATION NO. : 11/532488
DATED : February 7, 2012
INVENTOR(S) : Li et al.

It is certified that error appears in the above-identified patent and that said Letters Patent is hereby corrected as shown below:

In Col. 14, line 25, claim 1, delete "$\gamma_k(u_k) = \dfrac{\left|\hat{h}_k^T u_k\right|^2 + \sigma_h^2 \|u_k\|^2}{\sum_{l \neq k}\left(\left|\hat{h}_l^T u_k\right|^2 + \sigma_h^2 \|u_k\|^2\right)}$" and insert -- $\gamma_k(u_k) = \dfrac{\left|\hat{h}_k^T u_k\right|^2 + \sigma_h^2 \|u_k\|^2}{\sum_{l \neq k}\left(\left|\hat{h}_k^T u_k\right|^2 + \sigma_h^2 \|u_k\|^2\right)}$ --.

In Col. 15, line 9, claim 5, insert -- , -- after "K 1's".

Signed and Sealed this
Fifth Day of June, 2012

David J. Kappos
*Director of the United States Patent and Trademark Office*